3,741,720
PROCESS FOR THE CONTINUOUS DYEING OF POLYESTER FIBERS

Volker Hederich and Gunter Gehrke, Cologne, and Rutger Neeff, Leverkusen, Germany (all % Farbenfabriken Bayer Aktiengesellschaft, Leverkusen, Germany)
No Drawing. Filed Oct. 12, 1970, Ser. No. 79,717
Int. Cl. D06p 1/20
U.S. Cl. 8—39      8 Claims

ABSTRACT OF THE DISCLOSURE

The continuous dyeing of synthetic fibre materials from organic solvents. The fibre materials are impregnated with dye liquors which contain anthraquinone dyestuffs of the formula

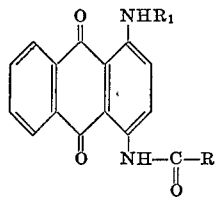

in which R represents a $C_1$–$C_{17}$-alkyl radical, an aralkyl or optionally substituted aryl radical and $R_1$ stands for an alkyl radical which may be substituted by alkoxy or alkylamino groups, for a cycloalkyl, aralkyl or for an optionally substituted aryl radical, and subsequently subjected to a heat treatment.

---

The present invention relates to a process for the continuous dyeing of synthetic fibre materials from organic solvents; more particularly it concerns a process for the continuous dyeing of synthetic fibre materials from organic solvents wherein the fibre materials are impregnated with the dye liquors which contain anthraquinone dyestuffs of the formula

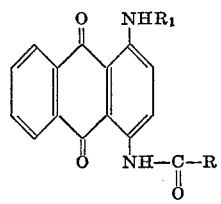

(I)

in which

R represents a $C_1$–$C_{17}$ alkyl radical, preferably a $C_3$–$C_{11}$ alkyl radical, an aralkyl or optionally substituted aryl radical, and $R_1$ stands for an alkyl radical which may be substituted by alkoxy or alkylamino groups, for a cycloalkyl, aralkyl or for an optionally substituted aryl radical, with the proviso that the sum total of the carbon atoms contained in R and $R_1$ is at least 5 and at most 35, and subsequently subjected to a heat treatment.

Examples of $C_1$–$C_{17}$ alkyl radicals suitable for R are the following:

the methyl-, ethyl-, propyl-, isopropyl-, n-butyl-, isobutyl-, sec.-butyl-, tert.-butyl-, n-pentyl-, iso-pentyl-, 2,2-dimethyl-propyl-, n-hexyl-, iso-hexyl-, n-heptyl-, 2-ethyl-pentyl-, n-nonyl-, n-decyl-, n-undecyl-, n-tridecyl-, n-pentadecyl-, n-heptadecyl-, propenyl-, undecenyl- and the octadecen-(9c)-yl-radical;

the aralkyl radical is the benzyl, 2-phenyl-ethyl, 3-phenyl-propyl, styryl and the cinnamyl radical;

the aryl radical is the phenyl, α-naphthyl, β-naphthyl, 4-diphenyl, chlorophenyl, methyl-phenyl and the methoxy-phenyl radical.

Radicals suitable for $R_1$ to be mentioned as examples: alkyl radicals are: $C_1$–$C_{18}$-alkyl such as the methyl, ethyl, propyl, isopropyl, n-butyl, tert.-butyl, sec.-butyl, n-amyl, 2-ethylhexyl, n-octyl, n-decyl, n-dodecyl, n-hexadecyl and the n-octadecyl radical; alkyl radicals substituted by alkoxy groups are: the 3-methoxy-propyl, 3-ethoxy-propyl and the 3-methoxy-butyl radical; alkyl radicals substituted by alkylamino groups are: the N,N-dimethylamino-ethyl, N,N - dimethylamino - propyl and the N,N-diethyl-amino-propyl radical; cycloalkyl radicals are the cyclohexyl, 2 - methyl - cyclohexyl, 4 - methyl - cyclohexyl, 4 - tert.-butyl-cyclohexyl, 4 - tert. - amyl - cyclohexyl, 4 - n - hexyl - cyclohexyl, 2,6 - dimethyl - cyclohexyl, 4 - benzyl - cyclohexyl and the 4 - ethoxy - cyclohexyl radical; aralkyl radicals are the benzyl, 2-phenylethyl, α-methyl-benzyl and the 1-methyl - 2 - phenylethyl radical; aryl radicals are the phenyl, methyl-phenyl, ethyl-phenyl, 4 - iso - propyl - phenyl, 4 - iso - butyl - phenyl, 4-tert.-butyl - phenyl, 4 - n - butyl - phenyl, 4 - iso-hexyl-phenyl, 4-iso-octyl-phenyl, cyclo-hexyl-phenyl, 2,4-dimethyl-phenyl, 2,5-dimethyl-phenyl, 2,6-dimethyl-phenyl, 2,6-diethyl-phenyl, 3,5-di-iso-propyl-phenyl, 2,4,6-trimethyl-phenyl, 4-methyl-2,6-diethyl-phenyl, 2,4,6-triethyl-phenyl, 2,4,5,6-tetramethyl-phenyl, 2,3,5,6-tetramethyl-phenyl, 4-benzyl-phenyl, α,α - dimethyl - benzyl - phenyl, 2-methyl-4-cyclohexyl-phenyl, 4-phenyl-phenyl, 1-naphthyl, 2-naphthyl, trifluoro - methyl - phenyl, 3 - methoxymethylene-phenyl, fluoro-phenyl, chloro-phenyl, 2,5-dichloro-phenyl, 3,4-dichloro-phenyl, 2,3,4 - trichloro-phenyl, 3,4,5 - trichloro-phenyl, 3 - bromo - phenyl, 2 - nitro - phenyl, 4-nitro-phenyl, diethyl - amino - phenyl, 4 - phenylamino-phenyl, 4 - acetylamino-phenyl, 3 - [4 - tosylamino] - phenyl, 4-methanesulphonylamino - phenyl, 4 - phenyl - sulphonyl-phenyl, cyano-phenyl, 4 - benzoyl - phenyl, 2,6-dimethyl-3 - acetyl - phenyl, 4 - methylmercapto - phenyl, methoxy-phenyl, 2 - ethoxy - phenyl, 4 - ethoxy - phenyl, 2,5-dimethoxy-phenyl, 3,5 - dimethoxy - phenyl, 3-iso-amyl-oxy-phenyl, 3 - iso - octyloxy - phenyl, 3,4-di-iso-propoxy-phenyl, 5 - chloro - 2 - methoxy - phenyl, 5-methyl-2-methoxy-phenyl, 4 - phenoxy - phenyl, 4-[4 - tosyloxy]-phenyl and the 4-ethoxycarbonyl-phenyl radical.

Those anthraquinone dyestuffs of the Formula I are preferred in which $R_1$ (a) represents a cyclohexyl radical optionally substituted by lower alkyl groups, (b) stands for an aryl radical of the formula

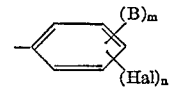

in which

B stands for a $C_1$-$C_9$ alkyl, cycloalkyl, aralkyl, $C_1$-$C_8$ alkoxy or alkylmercapto radical or for a trifluoromethyl radical, $m$ is a number from 0–4, $n$ is a number from 0–3, and Hal stands for a fluorine, chlorine or bromine atom, (c) is a $C_1$-$C_{18}$ alkyl radical, preferably a $C_3$-$C_{12}$ alkyl radical.

The dyestuffs used for the dyeing from organic solvents according to the invention are obtained in known manner, e.g. by reacting suitable 1-amino-4-alkyl- or arylamino-anthraquinone with carboxylic acid chlorides in inert solvents, such as pyridine, dimethyl formamide or N-methylpyrrolidone, or from suitable 4-chloro- or 4-bromo-1-acylamino-anthraquinones by the reaction with arylamines in the presence of acid-binding agents.

Organic solvents suitable for the process according to the invention are those solvents which are not miscible with water and the boiling points of which range between 40 to 150° C., e.g. aromatic hydrocarbons, such as toluene and xylene; halogenated hydrocarbons, particularly aliphatic chlorinated hydrocarbons, such as methylene chloride, chloroform, carbon tetrachloride, 1,1-dichloroethane, 1,2-dichloro-ethane, 1,1,2-trichloro-ethane, 1,1,1,2-tetrachloro-ethane, 1,1,2,2-tetrachloro-ethane, pentachloro-ethane, 1-chloropropane, 1,2-dichloropropane, 1,1,1-trichloropropane, 1-chlorobutane, 2-chlorobutane, 1,4-dichloro-butane, 1-chloro-2-methylpropane or 2-chloro-2-methylpropane, as well as aliphatic fluorinated or fluorochlorinated hydrocarbons, such as perfluoro-n-hexane, 1,2,2 - trifluoro-trichloroethane and 1,1,1-trifluoropentachloropropane; aromatic chlorinated and fluorinated hydrocarbons, such as chlorobenzene, fluorobenzene, chlorotoluene and benzotrifluoride. Tetrachloroethylene, trichloroethylene and 1,1,1-trichloroethane have proved to be particularly suitable. Mixtures of these solvents can also be used.

The synthetic fibre materials to be dyed by the process according to the invention are primarily fibre materials obtained from polyesters, e.g. polyethylene-terephthalates, or polyesters obtained from 1,4-bis-(hydroxymethyl)-cyclohexane and terephthalic acid, from cellulose triacetate, from synthetic polyamides, such as poly-ε-caprolactam, polyhexamethylenediamine adipate or poly-ω-aminoundecanic acid, from polyurethanes or from polyolefins. The fibre materials can be present in the form of woven and knitted fabrics.

The dyestuffs to be used according to the invention are dissolved for the dyeing in the organic, water-immiscible solvents, or they are added to the latter in the form of solutions in solvents which are miscible with these solvents to an unlimited extent, such as alcohols, dimethyl formamide, dimethyl acetamide, dimethyl sulphoxide or sulpholan, and the synthetic fibre materials are impregnated with the clear dyestuff solutions obtained which, in order to improve the levelness of the dyeings, may also contain soluble, non-ionic auxiliaries, e.g. the known surface-active ethoxylated and propoxylated products of fatty alcohols, alkyl phenols, fatty acid amides and fatty acids. The dyestuffs are subsequently fixed on the fibre materials by a heat treatment. The heat treatment may consist in a brief dry-heat treatment at 120–230° C., an intermediate drying possibly preceding the heat treatment or, alternatively, in a treatment of the fibre materials in a superheated solvent vapour at 100–150° C. Small amounts of non-fixed dyestuff can be rinsed off by a brief treatment with the cold organic solvent. It may be mentioned that in some cases mixtures of the dyestuffs to be used according to the invention result in a better dye yield than the individual dyestuffs and may possibly have a better solubility in the organic medium.

With the aid of the process according to the invention it is possible to attain, when carrying out the dyeing from organic solvents, dyeings on synthetic fibre materials, which are distinguished by a high dyestuff yield, very good texture as well as by outstanding fastness properties, particularly very good fastness to thermofixing, washing, rubbing and light. Another advantage of the dyestuffs to be used according to the invention is their ready solubility in organic solvents, especially in tetrachloroethylene, trichloroethylene, 1,1,1-trichloroethane and 1,1,1-trichloropropane, and this enables the dyeing to be carried out without the use of solutes.

The parts given in the following examples are parts by weight.

EXAMPLE 1

A fabric of polyethylene terephthalate fibres is impregnated at room temperature with a clear reddish blue solution which contains 10 parts 1-lauroylamino-4-anilino-anthraquinone in 990 parts tetrachloroethylene.

After squeezing the fabric to a weight increase of 60%, it is dried at 80° C. for 1 minute. The dyestuff is subsequently fixed by heating the fabric at 190–220° C. for 45 seconds. The small amount of non-fixed dyestuff is subsequently washed out by a brief treatment for 20 seconds in cold tetrachloroethylene. After drying, a clear reddish blue dyeing is obtained which is characterised by its high dyestuff yield, very good texture as well as by very good fastness properties, especially very good fastness to thermofixing, washing, rubbing and light.

In an analogous manner equivalent reddish blue dyeings were obtained on fabrics of (a) cellulose triacetate,
(b) synthetic polyamides or polyurethanes, and
(c) polypropylene fibres;

however, the thermofixing was carried out for (a) at 200–220° C.,
for (b) at 170–200° C., and
for (c) at 120–150° C.

Equivalent dyeings were also obtained by replacing the 990 parts tetrachloroethylene by the same amount of one of the following solvents: methylene chloride, chloroform, carbon tetrachloride, dichloroethane, trichloroethane, trichloroethylene, tetrachloroethane, dichloropropane, 1,1,1-trichloropropane, chlorobutane, dichlorobutane, perfluore-n-hexane, 1,2,2-trifluoro-trichloro-ethane and 1,1,1-trifluoropentachloropropane.

The dyestuff used was prepared as follows:

10 parts 1-amino-4-anilino-anthraquinone were dissolved in 80 parts N-methylpyrrolidone and mixed at 70° C. with 12 parts lauric acid chloride. The reaction mixture was kept at 70° C. for 30 minutes. The resulting dyestuff was precipitated with 100 parts methanol, cooled for several hours in an ice-bath, filtered off with suction and washed with methanol and water. Yield: 14.8 parts; melting point, after recrystallisation from pyridine, 105–106° C.

EXAMPLE 2

A knitted fabric of polyhexamethylene-diamine-adipate filaments is impregnated at room temperature with a clear reddish blue solution which contains 10 parts 1-isovalerylamino-4-cyclohexylamino-anthraquinone, and 7 parts nonylphenol-heptaethylene glycol ether, in 983 parts tetrachloroethylene.

After squeezing the fabric to a weight increase of 60%, it is dried at 80° C. for 1 minute. The dyestuff is subsequently fixed by heating the fabric at 192° C. for 45 seconds. Small non-fixed portions of the dyestuff are then washed out by a brief treatment in cold tetrachloroethylene. After drying, a clear reddish blue dyeing is obtained which is characterised by its high dyestuff yield, very good texture and good fastness properties, especially good fastness to thermofixing, washing, rubbing and light.

An equivalent reddish blue dyeing was obtained in an analogous manner on an anionically modified polyhexamethylene-diamine adipate fabric.

An equivalent dyeing was likewise obtained by replacing the 983 parts tetrachloroethylene by the same amount of toluene, xylene, chlorobenzene, dichlorobenzene or 1,2,2-trifluoro-trichloroethane.

The dyestuff employed was prepared as follows:

10 parts 1-amino-4-cyclohexylamino-anthraquinone were heated at 70–80° C. for 45 minutes with 80 parts N-methylpyrrolidone and 8 parts isovaleryl chloride. After the addition of 150 parts methanol and allowing the mixture to stand in an ice-bath for several hours, the precipitated dyestuff was filtered off with suction, rinsed with methanol and water, and dried.

Yield: 11.7 parts dyestuff which melted, after recrystallisation from glacial acetic acid, at 206–207° C.

EXAMPLE 3

A fabric of polypropylene fibres is impregnated at room temperature with a clear violet solution which contains 10 parts 1-stearoylamino-4-methylamino-anthraquinone and 7 parts nonylphenol-heptaethylene-glycol ether in 983 parts tetrachloroethylene.

After squeezing the fabric to a weight increase of 60%, it is dried at 80° C. for 1 minute. The dyestuff is subsequently fixed by heating the fabric at 140° C. for 30 seconds. After a brief treatment in cold solvent, the non-fixed dyestuff portions can be washed out. A clear violet dyeing is obtained which is characterised by a high dyestuff yield, very good texture and good fastness properties, especially good fastness to thermofixing, washing, rubbing and light.

The dyestuff employed was prepared as described in Example 1 but using, instead of the 10 parts 1-amino-4-anilino-anthraquinone, an equivalent amount of 1-amino-4-methylaminoanthraquinone and, instead of the 12 parts lauric acid chloride, an equivalent amount of stearoyl chloride.

EXAMPLE 4

A fabric of poly-1,4-cyclohexane-dimethyleneterephthalate is impregnated at room temperature with a clear reddish blue solution which contains 10 parts 1-(3-pentane-carbonylamino)-4-anilinoanthraquinone and 7 parts nonylphenol-heptaethylene glycol ether in 983 parts tetrachloroethylene.

After squeezing the fabric to a weight increase of 60%, it is dried at 80° C. for 1 minute. The dyestuff is subsequently fixed by heating the fabric at 190–220° C. for 45 seconds. Non-fixed dyestuff amounts can be washed out by a brief treatment for 20 seconds in cold tetrachloroethylene. After drying, a clear reddish blue dyeing is obtained which is characterised by its high dyestuff yield, very good texture and very good fastness properties, especially good fastness to thermofixing, washing, rubbing and light.

A clear reddish blue dyeing was obtained on anionically modified polyethylene terephthalate filaments in an analogous manner.

The dyestuff employed was prepared as follows:

10 parts 1-amino-4-anilino-anthraquinone were heated at 80° C. for 1 hour in 80 parts anhydrous pyridine with 7 parts pentane-carbonyl-chloride-(3). The reaction mixture was then cooled, mixed with 100 parts methanol and stored for several hours in an ice-bath. The precipitated dyestuff was filtered off with suction, rinsed with methanol and water, and dried.

Yield: 12.2 parts; melting point, after recrystallisation from pyridine: 170–171° C.

EXAMPLE 5

A fabric of polyethylene terephthalate fibres is impregnated at room temperature with a clear reddish blue solution which contains 10 parts 1-(2,2-dimethylpropionyl-amino)-4-p-anisidino-anthraquinone, and 7 parts nonylphenol-heptaethylene glycol ether in 983 parts tetrachloroethylene.

After squeezing the fabric to a weight increase of 60%, it is dried at 80° C. for one minute. The dyestuff is subsequently fixed by heating the fabric at 190–220° C. for 45 seconds. The small non-fixed dyestuff portion is then washed out by a brief rinsing with cold tetrachloroethylene. After drying a clear reddish blue dyeing is obtained which is characterised by its high dyestuff yield, very good texture as well as very good fastness properties, particularly very good fastness to thermofixing, washing, rubbing and light.

The dyestuff employed was prepared as described in Example 1, but by replacing 1-amino-4-anilino-anthraquinone by an equivalent amount of 1-amino-4-p-anisidino-anthraquinone, and replacing the lauric acid chloride by 2,2-dimethyl-propionic acid chloride.

EXAMPLE 6

A fabric of polyethylene terephthalate fibres is impregnated with a clear reddish blue solution which contains 10 parts 1-(2-ethyl-pentane-carbonylamino)-4-p-toluidino-anthraquinone in 990 parts 1,1,1-trichloroethane.

After squeezing the fabric to a weight increase of 60%, the dyestuff is fixed by heating the fabric with superheated 1,1,1-trichloroethane vapour at 140° C. The small non-fixed dyestuff portion is subsequently washed out by briefly rinsing in cold 1,1,1-trichloroethane. After drying, a clear reddish blue dyeing is obtained which is characterised by its high dyestuff yield, very good texture and very good fastness properties.

The dyestuff employed was prepared as follows:

10 parts 1-amino-4-p-toluidino-anthraquinone were dissolved in 80 parts N-methyl-pyrrolidone and mixed with 10 parts 2-ethyl-pentane-carboxylic acid chloride. The reaction mixture was heated at 80° C. for 30 minutes, cooled, diluted with 100 parts methanol and stored in an ice-bath for several hours. The precipitated dyestuff was then filtered off with suction, rinsed and dried.

Yield: 11.7 parts; melting point, after recrystallisation from glacial acetic acid, 154–155° C.

EXAMPLE 7

A fabric of poly-1,4-cyclohexane-dimethylene terephthalate is impregnated at room temperature with a clear violet solution which contains 10 parts 1-tetradecanoyl-amino-4-(4-methyl-2,6-diethyl-anilino)-anthraquinone in 990 parts tetrachloroethylene.

After squeezing the fabric to a weight increase of 60%, the dyestuff is fixed by heating the fabric with superheated tetrachloroethylene vapour at 150° C. for 35 seconds. The small non-fixed dyestuff amount is then washed out by a brief rinsing in cold tetrachloroethylene. After drying, a clear violet dyeing is obtained which is characterised by its high dyestuff yield, very good texture as well as by very good fastness properties.

The dyestuff employed was prepared as described in Example 6, but by replacing 1-amino-4-p-toluidino-anthraquinone and 2-ethyl-pentane-carbonyl chloride by equivalent amounts of 1-amino-4-(4-methyl-2,6-diethyl-anilino)-anthraquinone and tetradecanoyl chloride.

Clear reddish blue to violet dyeings with outstanding fastness properties were likewise obtained on fabrics of polyester, triacetate, polyamide, polyurethane and polyolefin fibres when, instead of the dyestuffs indicated in Examples 1–7, the same amount of one of the dyestuffs set out in the following table was used:

| Ex. | Dyestuff |
|---|---|
| 8 | 1-[2-ethyl-pentane-carbonyl-amino]-4-ethylamino-anthraquinone. |
| 9 | 1-lauroylamino-4-isopropylamino-anthraquinone. |
| 10 | 1-heptane-carbonylamino-4-n-butylamino-anthraquinone. |
| 11 | 1-(2,2-dimethylpropionylamino)-4-n-decylamino-anthraquinone. |
| 12 | 1-n-butyrylamino-4-n-dodecylamino-anthraquinone. |
| 13 | 1-(2-ethyl-pentane-carbonylamino)-4-(2-methoxyethylamino)-anthraquinone. |
| 14 | 1-undecanoylamino-4-([3-N,N-dimethylamino]-propylamino)-anthraquinone. |
| 15 | 1-n-butyrylamino-4-cyclohexylamino-anthraquinone. |
| 16 | 1-n-hexadecanoylamino-4-cyclohexylamino-anthraquinone. |
| 17 | 1-isovalerylamino-4-(2-methyl-cyclohexylamino)-anthraquinone. |
| 18 | 1-lauroylamino-4-(4-methyl-cyclohexylamino)-anthraquinone. |
| 19 | 1-(2-methyl-butyrylamino)-4-(4-benzyl-cyclohexylamino)-anthraquinone. |
| 20 | 1-n-pentane-carbonylamino-4-benzylamino-anthraquinone. |
| 21 | 1-n-heptane-carbonylamino-4-(2-phenylethylamino)-anthraquinone. |
| 22 | 1-methacryloylamino-4-n-hexylamino-anthraquinone. |
| 23 | 1-oleoylamino-4-(1-methyl-2-phenyl-ethylamino)-anthraquinone. |
| 24 | 1-cinnamoylamino-4-(α-methyl-benzylamino)-anthraquinone. |
| 25 | 1-tetradecanoylamino-4-anilino-anthraquinone. |
| 26 | 1-isovalerylamino-4-(2-toluidino)-anthraquinone. |
| 27 | 1-stearoylamino-4-(4-ethylanilino)-anthraquinone. |
| 28 | 1-(2-ethyl-butyrylamino)-4-(isopropyl-anilino)-anthraquinone. |
| 29 | 1-n-heptane-carbonylamino-4-(4-isooctyl-anilino)-anthraquinone. |
| 30 | 1-lauroylamino-4-(4-cyclohexyl-anilino)-anthraquinone. |
| 31 | 1-(2-methyl-butyrylamino)-4-(2-cyclohexyl-anilino)-anthraquinone. |
| 32 | 1-n-decanoylamino-4-(2,4-dimethyl-anilino)-anthraquinone. |
| 33 | 1-(2-ethyl-butyrylamino)-4-(2,6-diethyl-anilino)-anthraquinone. |
| 34 | 1-(tert.-butyrylamino)-4-(3,5-di-isopropyl-anilino)-anthraquinone. |
| 35 | 1-lauroylamino-4-(2,4,6-triethyl-anilino)-anthraquinone |
| 36 | 1-isovalerylamino-4-(2,3,5,6-tetramethyl-anilino)-anthraquinone. |
| 37 | 1-n-decanoylamino-4-(4-benzyl-anilino)-anthraquinone. |
| 38 | 1-isovalerylamino-4-(α-α-dimethylbenzyl-anilino)-anthraquinone. |
| 39 | 1-stearoylamino-4-(2-methyl-4-cyclohexyl-anilino)-anthraquinone. |
| 40 | 1-n-hexane-carbonylamino-4-(4-phenyl-anilino)-anthraquinone. |
| 41 | 1-isovalerylamino-4-(1-naphthylamino)-anthraquinone. |
| 42 | 1-n-decanoylamino-4-(2-naphthylamino)-anthraquinone. |
| 43 | 1-(3,3-dimethyl-butyrylamino)-4-(4-trifluoromethylanilino)-anthraquinone. |
| 44 | 1-(2-ethyl-pentane-carbonylamino)-4-(3-difluoromethyl-anilino)-anthraquinone. |
| 45 | 1-lauroylamino-5-(3-methoxymethylene-anilino)-anthraquinone. |
| 46 | 1-(2-ethyl-butyrylamino)-4-(4-fluoroanilino)-anthraquinone. |
| 47 | 1-isovalerylamino-4-(3-chloroanilino)-anthraquinone. |
| 48 | 1-n-tetradecanoylamino-4-(2,5-dichloro-anilino)-anthraquinone. |
| 49 | 1-n-hexane-carbonylamino-4-(2,3,4-trichloro-anilino)-anthraquinone. |
| 50 | 1-n-decanoylamino-4-(3-bromo-anilino)-anthraquinone. |
| 51 | 1-lauroylamino-4-(4-nitro-anilino)-anthraquinone. |
| 52 | 1-(2-ethyl-pentane-carbonylamino)-4-(4-N,N-diethylamino-anilino)-anthraquinone. |
| 53 | 1-n-octane-carbonylamino-4-(4-phenylamino-anilino)-anthraquinone. |
| 54 | 1-isovalerylamino-4-(4-acetyl-anilino)-anthraquinone. |
| 55 | 1-isooctylcarbonylamino-4-(3-[4-tosylamino]-anilino)-anthraquinone. |
| 56 | 1-lauroylamino-4-(4-methylsulphonylamino-anilino)-anthraquinone. |
| 57 | 1-(2-ethyl-pentane-carbonylamino)-4-(3-cyano-anilino)-anthraquinone. |
| 58 | 1-n-heptane-carbonylamino-4-(4-benozyl-anilino)-anthraquinone. |
| 59 | 1-(2-ethyl-butyrylamino)-4-(2,6-dimethyl-4-acetylanilino)-anthraquinone. |
| 60 | 1-hexane-carbonylamino-4-(4-phenylsulphonyl-anilino)-anthraquinone. |
| 61 | 1-isovalerylamino-4-(4-methylmercapto-anilino)-anthraquinone. |
| 62 | 1-n-tetradecanoylamino-4-(4-methoxy-anilino)-anthraquinone. |
| 63 | 1-(3,3-dimethyl-butyrylamino)-4-(2-ethoxy-anilino)-anthraquinone. |
| 64 | 1-n-butyrylamino-4-(4-ethoxy-anilino)-anthraquinone. |
| 65 | 1-lauroylamino-4-(2,5-dimethoxy-anilino)-anthraquinone. |
| 66 | 1-propionylamino-4-(3-iso-amyloxy-anilino)-anthraquinone. |
| 67 | 1-acetylamino-4-(3-iso-octyloxy-anilino)-anthraquinone. |
| 68 | 1-tert.-butyrylamino-4-(3,4-di-isopropoxy-anilino)-anthraquinone. |
| 69 | 1-n-hexane-carbonylamino-4-(5-chloro-2-methoxy-anilino)-anthraquinone. |
| 70 | 1-lauroylamino-4-(4-phenoxy-anilino)-anthraquinone. |
| 71 | 1-(2-ethyl-pentane-carbonylamino)-4-(4-[4-tosyloxy]-anilino)-anthraquinone. |
| 72 | 1-lauroylamino-4-(4-ethoxy-carbonyl-anilino)-anthraquinone. |

EXAMPLE 73

A fabric of cellulose triacetate fibres is impregnated at room temperature with a clear reddish blue solution which contains 10 parts of a dyestuff mixture which was prepared in the manner described below by acylation of 1-amino-4-anilino-anthraquinone with equivalent amounts of isovaleryl chloride and 2-ethyl-pentane-carbonyl chloride and 7 parts nonylphenol-heptaethylene glycol ether in 983 parts tetrachloroethylene.

After squeezing the fabric to a weight increase of 60%, it is dried at 80° C. for 1 minute. The dyestuff is subsequently fixed by heating the fabric at 215° C. for 1 minute. A clear reddish blue dyeing is obtained which is characterized by a high dyestuff yield, very good texture and very good fastness properties, particularly very good fastness to thermofixing, washing, rubbing and light.

The above dyestuff mixture was prepared as follows: 10 parts 1-amino-4-anilino-anthraquinone were dissolved in 70 parts N-methylpyrrolidone. After the addition of 3.5 parts isovaleryl chloride, the solution was heated to 70° C. and stirred at the same temperature for 15 minutes, 5 parts 2-ethyl-pentane-carbonyl chloride were then added and stirring was continued at 70° C. for 30 minutes. The resultant reaction product was precipitated by the addition of 100 parts methanol, filtered off with suction while cold, and rinsed with methanol and water.

Yield: 11.2 parts of the above dyestuff mixture.

We claim:

1. Process for the continuous dyeing of synthetic polyester fiber material comprising the steps of
   (A) impregnating the fiber material with a non-aqueous dyeing liquor consisting essentially of an organic solvent and an anthraquinone dyestuff said organic solvent consisting of water-immiscible halogenated hydrocarbon solvent having a boiling point between 40° C. and 150° C. said anthraquinone dyestuff having the formula

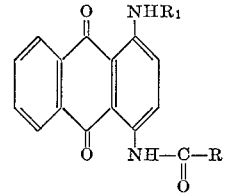

in which R is $C_1$–$C_{17}$-alkyl or aralkyl; and $R_1$ is alkyl, alkyl substituted by lower alkoxy or alkylamino; cycloalkyl; cycloalkyl substituted by lower alkyl; aralkyl; unsubstituted aryl or substituted aryl; with the proviso that the total carbon atoms in R and $R_1$ is 5 to 35;
   (B) subjecting the fiber material to a heat-treatment to fix said dyestuff on said fiber.

2. The process of claim 1 in which $R_1$ is cycloalkyl or cycloalkyl substituted by lower alkyl.

3. The process of claim 1 in which $R_1$ has the formula

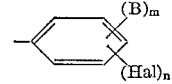

in which
   B is $C_1$–$C_9$-alkyl, cycloalkyl, aralkyl, $C_1$–$C_8$-alkoxy, $C_1$–$C_8$-alkylmercapto or trifluoromethyl; and
   Hal is fluorine, chlorine or bromine;
   $m$ is a number from 0 to 4; and
   $n$ is a number from 0 to 3.

4. The process of claim 1 in which $R_1$ is $C_1$–$C_{18}$-alkyl.

5. The process of claim 1 in which said anthraquinone dyestuff is soluble in said water-immiscible organic solvent.

6. The process of claim 1 in which the dyed material is subjected to a subsequent step of (C) rinsing with water-immiscible organic solvent in which said anthraquinone dyestuff is soluble.

7. The process of claim 1 in which said water-immiscible organic solvent is an aliphatic chlorohydrocarbon having a boiling point of between 40 and 150° C.

8. The process of claim 1 in which said water-immiscible organic solvent is selected from the group consisting of tetrachloroethylene, trichloroethylene, 1,1,-trichloroethane, 1,1,1-trichloropropane and mixtures thereof.

References Cited

UNITED STATES PATENTS

| | | | |
|---|---|---|---|
| 2,184,559 | 12/1939 | Mellor et al. | 8—175 |
| 2,274,751 | 3/1942 | Sowter et al. | 8—173 |
| 3,473,175 | 10/1969 | Seiber | 8—139.1 |
| 3,473,882 | 10/1969 | Weber et al. | 260—377 X |
| 3,510,243 | 5/1970 | Seuret et al. | 8—39 |
| 957,041 | 5/1910 | Deinet | 260—377 |

FOREIGN PATENTS

| | | | |
|---|---|---|---|
| 1,581,325 | 9/1969 | France | 8—174 |
| 1,217,380 | 12/1970 | Great Britain | 8—174 |

OTHER REFERENCES

WAS White: Amer. Dyestuff Reporter, July 31, 1967, pp. 18–24.

L. Petters et al.: JSOC, March 1958, p. 183.

HERBERT B. GUYNN, Primary Examiner

T. J. HERBERT, JR., Assistant Examiner

U.S. Cl. X.R.

8—25, 174; 260—377